Patented Oct. 12, 1937

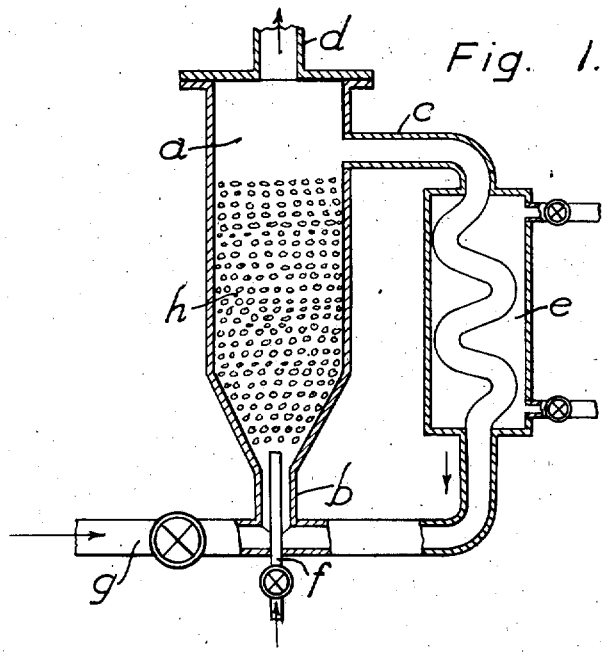
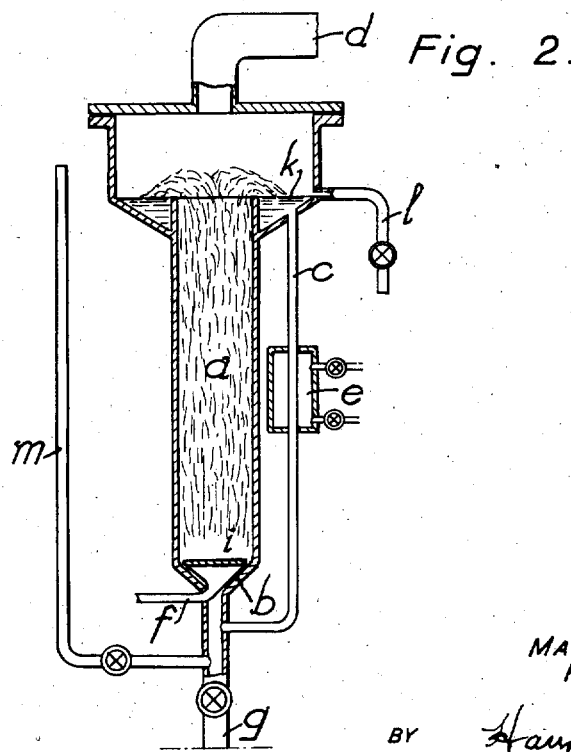

2,095,338

UNITED STATES PATENT OFFICE 2,095,338

PROCESS FOR OXIDIZING ORGANIC SUBSTANCES IN THE LIQUID PHASE AND APPARATUS THEREFOR

Martin Luther, Mannheim, and Karl Goetze, Ludwigshafen-on-the-Rhine, Germany, assignors to I. G. Farbenindustrie Aktiengesellschaft, Frankfort-on-the-Main, Germany Application February 25, 1935, Serial No. 8,066 In Germany August 20, 1927

5 Claims. (Cl. 196—142)

The present invention relates to an improved process for oxidizing from liquid to solid organic compounds, such as oils, fats and waxes, preferably solid or liquid paraffinic hydrocarbons in the liquid phase by means of gases containing oxygen, and apparatus therefor.

This application is a continuation-in-part of our application Ser. No. 298,958, filed on August 11th, 1928, now U. S. Patent 2,015,347.

We have found that liquid by meltable solid organic substances can be oxidized in the liquid phase by means of gases containing oxygen such as air, by admitting the said organic substances in conjunction with the said gases at the bottom into a reaction vessel provided with means for causing the said organic substances to foam in the interior of the said vessel, lifting the resulting foam by means of said gases, leading off separately the said gases and organic substances in the upper part of the said vessel and recycling the organic compounds to the lower part of the reaction vessel. The liquid is again introduced in conjunction with gas containing oxygen. Fresh organic liquid may be introduced with the recycled material; in this case it is preferable to withdraw from the cycle continuously, preferably near the top of the apparatus such amounts of treated material as correspond to the amounts freshly added. The recycling of the organic substances may be effected by means of one or several pipes. The circulation of the material is carried on until the reaction between the liquid and the gas has progressed to the desired extent.

The oxidizing gases are introduced through a device securing fine division, for example a porous plate of a ceramic material, fritted glass or sintered metals. Other porous bodies, such as filtering candles or cones may also be employed. Nets or non-porous plates with fine openings, fine nozzles or similar suitable means may be used. The gas introduced through such devices forms fine bubbles and thus causes the formation of foam. The foaming can be effected so intensely that it is not necessary to employ filler bodies; it is, however, possible to fill the reaction space partly or wholly with inert or catalytic fillers. As a rule, it is preferable to separate the gases or vapors after they have passed the reaction zone; for example the gases may be led off at the top of the vessel through a separate pipe. The foam is preferably gathered in a ring-shaped space at the upper part of the reaction vessel where it is reconverted into liquid and gas. The gas containing oxygen released and led off may be freed in a suitable device from volatile or entrained particles which have been carried away. From the upper part, for example from the aforesaid ring-shaped space, the material is passed through one or several pipes down to the lower part of the reaction vessel and reintroduced into the apparatus. Especially when rapid circulation is desired and much air is blown through the mass it is advantageous to employ a plurality of pipes. The pipes are preferably provided with means for controlling the temperature, i. e. for cooling or, if desired, for heating. By the said heat-controlling means the temperature in the reaction vessel may be adjusted or maintained as desired. The circulation is carried on by the movement of the gas and a pump is therefore usually unnecessary.

The process is especially suitable for oxidizing oils, fats, waxes of vegetable or animal origin or aliphatic hydrocarbons which are solid or liquid at ordinary temperature. Suitable temperatures are from about 100° to about 220° C.; for example hard paraffin wax may be treated at from 140° to 160° C.

In the following the process is described in detail with reference to the accompanying drawing. Figures 1 and 2 are longitudinal sections of two apparatus suitable for carrying out the oxidation. In each of the two figures $a$ is the reaction vessel which may be provided with a heating or cooling jacket or coil (not shown), $b$ is an inlet for the material to be treated, $c$ is a pipe for recycling the liquid from the top of the apparatus to the lower part, $e$ is a heating or cooling device, $f$ a pipe for introducing the gas containing oxygen and $g$ a pipe for clearing the reaction vessel.

In Figure 1, $h$ represents filler bodies. In Figure 2, $i$ is a porous plate, or a plate having fine openings, or the like for bringing the gas containing oxygen into fine division. $k$ is a ring-shaped space in which the parts frothed over are collected and reconverted into liquid and gas. If the oxidation is carried out continuously in the apparatus shown in Figure 2 the fresh material is introduced through pipe $m$ and an adequate amount of reacted material is withdrawn through the overflow pipe $l$.

The following examples will further illustrate the nature of this invention but the invention is not restricted to these examples.

*Example 1*

Crude scale wax is molten and introduced through pipe $g$ and the inlet $b$ into the reaction vessel a consisting of a chromium-nickel-steel stable to corrosion containing ring-shaped fillers consisting of the same material shown in Figure 1. About two-thirds of the vessel a is filled. Air is blown into the apparatus through f. Hereby the whole mass is caused to foam and brought into circulation. The air leaves the apparatus through d and particles carried away by the stream of air are removed in a stripping vessel. The liquid material flows down through c and reenters the apparatus through b. Until the desired reaction temperature of about 150° C. is attained the liquid flowing down through c is heated in e by heat exchange with a suitable heating medium. As soon as the said temperature is reached in the reaction vessel heating in e is stopped. Since the oxidation is exothermic it may even be suitable to cool the material flowing down through c in e. When the material is oxidized to the desired degree, air is no longer introduced and the reacted material is removed through g.

*Example 2*

The reaction vessel a consisting of a chromium-nickel-steel stable to corrosion is filled up to from one half to two thirds of its volume with crude scale wax. The wax is molten, for example by means of a heating coil (not shown). Half a cubic meter of air is blown in per hour and kilogram of wax through pipe f and the porous plate i. The foam thus formed moves upward and froths over into the ring shaped space k where it is reconverted into liquid. The air leaves the apparatus through d. The liquid recollected in k flows down to pipe c and reenters the reaction space through b. Until the reaction temperature of 150° C. is attained the heating up effected by the aforesaid heating-coil may be assisted by heating the material flowing down through c in e. As soon as the wax has reached the temperature of 150° C. the heating by the heating-coil and device e is stopped. In order to avoid overheating, the recycled material is cooled in e. In this operation the whole content of the apparatus circulates once in from one to two minutes. As soon as the wax is oxidized to the desired degree fresh material is introduced continuously through pipe m and the corresponding amount of treated material leaves the apparatus through overflow l. In this manner it is possible to carry out the process continuously for a long period of time. The products may be worked up in the usual manner whereby acids or alcohols can be obtained.

Instead of crude scale wax, castor oil, linseed oil, train oil or the like may be treated in an analogous manner in the said apparatus. In the case of castor oil the reaction is preferably carried out at 135° C. until the desired viscosity has been reached. An especially light-colored product which is a very suitable softening agent for lacquers is obtained.

What we claim is:—

1. The process of oxidizing an organic substance in the liquid phase by means of a gas containing oxygen which comprises admitting the said organic substance in conjunction with the said gas at the bottom into a reaction vessel provided with means for causing the said organic substance to foam in the interior of the said vessel, lifting the resulting foam by means of the said gas, leading off separately said gas and organic substance in the upper part of the said vessel, recycling the organic substances reconverted into the liquid non-foamy state to the lower part of the reaction vessel into which it is anew admitted in conjunction with gas containing oxygen, while maintaining a reaction temperature between about 100° and about 220° C. at least partly by cooling the organic substance outside the said vessel during recycling.

2. The process of oxidizing an organic substance in the liquid phase by means of a gas containing oxygen which comprises admitting the said organic substance in conjunction with the said gas at the bottom into a reaction vessel provided with means for causing the said organic substance to foam in the interior of the said vessel, lifting the resulting foam by means of the said gas, leading off separately said gas and organic substance in the upper part of the said vessel, recycling the organic substance reconverted into the liquid non-foamy state to the lower part of the reaction vessel into which it is anew admitted in conjunction with gas containing oxygen, while maintaining a reaction temperature between about 100° and about 220° C. at least partly by cooling the organic substance outside the said vessel during recycling and continuously adding fresh organic substance together with the recycled material and continuously withdrawing a corresponding amount of reacted material.

3. The process of oxidizing an organic substance in the liquid phase by means of a gas containing oxygen which comprises admitting the said organic substance in conjunction with the said gas at the bottom into a reaction vessel provided with means for causing the said organic substance to foam in the interior of the said vessel, lifting the resulting foam by means of the said gas, leading off separately said gas and organic substance in the upper part of the said vessel, recycling the organic substance reconverted into the liquid non-foamy state to the lower part of the reaction vessel into which it is anew admitted in conjunction with gas containing oxygen, while adjusting a reaction temperature between about 100° and about 220° C. at least partly by cooling the organic substance outside the said vessel during recycling and causing the whole organic substance under treatment to circulate once in at most two minutes.

4. An apparatus for oxidizing organic substances in the liquid phase, comprising a reaction vessel, means for introducing at the lower part thereof a gas containing oxygen and in conjunction therewith an organic substance, means for breaking up the introduced stream of oxygen containing gas into finely divided streams, said means being adapted to cause the organic substance to foam, means for leading off gas at the upper part of the said vessel and separate therefrom means for collecting foam and liquid at the upper part, said means being adapted to separate the foam into gas and liquid, a device for recycling substantially only the liquid to the lower part of the said vessel and in connection with the said device an apparatus for cooling.

5. An apparatus for oxidizing organic substances in the liquid phase, comprising a reaction vessel, means for introducing at the lower part thereof a gas containing oxygen and in conjunction therewith an organic substance, means for breaking up the introduced stream of oxygen containing gas into finely divided streams, said means being adapted to cause the organic substance to foam, means for leading off gas at the upper part of the said vessel and separate therefrom means for collecting foam and liquid at the upper part, said means being adapted to separate the foam into gas and liquid, a device for recycling substantially only the liquid to the lower part of the said vessel and in connection with the said device an apparatus for cooling and an inlet for fresh material at the lower and an overflow for reacted material at the upper part of the said vessel.

MARTIN LUTHER.
KARL GOETZE.

CERTIFICATE OF CORRECTION.

Patent No. 2,095,338.                                    October 12, 1937.

MARTIN LUTHER, ET AL.

It is hereby certified that error appears in the printed specification of the above numbered patent requiring correction as follows: Page 1, first column, line 10, for the word "by" read or; and second column, line 34, after "part," insert the words and comma d is a device for leading off the gases, ; and that the said Letters Patent should be read with these corrections therein that the same may conform to the record of the case in Patent Office.

Signed and sealed this 8th day of February, A. D. 1938.

(Seal)

Henry Van Arsdale,
Acting Commissioner of Patents.

stance to foam, means for leading off gas at the upper part of the said vessel and separate therefrom means for collecting foam and liquid at the upper part, said means being adapted to separate the foam into gas and liquid, a device for recycling substantially only the liquid to the lower part of the said vessel and in connection with the said device an apparatus for cooling and an inlet for fresh material at the lower and an overflow for reacted material at the upper part of the said vessel.

MARTIN LUTHER.
KARL GOETZE.

CERTIFICATE OF CORRECTION.

Patent No. 2,095,338.   October 12, 1937.

MARTIN LUTHER, ET AL.

It is hereby certified that error appears in the printed specification of the above numbered patent requiring correction as follows: Page 1, first column, line 10, for the word "by" read or; and second column, line 34, after "part," insert the words and comma d is a device for leading off the gases, ; and that the said Letters Patent should be read with these corrections therein that the same may conform to the record of the case in Patent Office.

Signed and sealed this 8th day of February, A. D. 1938.

(Seal)

Henry Van Arsdale,
Acting Commissioner of Patents.

CERTIFICATE OF CORRECTION.

Patent No. 2,095,338.　　　　　　　　　　　　　　October 12, 1937.

MARTIN LUTHER, ET AL.

It is hereby certified that error appears in the printed specification of the above numbered patent requiring correction as follows: Page 1, first column, line 10, for the word "by" read or; and second column, line 34, after "part," insert the words and comma d is a device for leading off the gases, ; and that the said Letters Patent should be read with these corrections therein that the same may conform to the record of the case in Patent Office.

Signed and sealed this 8th day of February, A. D. 1938.

(Seal)

Henry Van Arsdale,
Acting Commissioner of Patents.